US009354053B2

(12) United States Patent
You-Hong

(10) Patent No.: US 9,354,053 B2
(45) Date of Patent: May 31, 2016

(54) CLINOMETER APPARATUS

(71) Applicant: KOREA INSTITUTE OF GEOSCIENCE AND MINERAL RESOURCES, Daejeon (KR)

(72) Inventor: Kihm You-Hong, Daejeon (KR)

(73) Assignee: KOREA INSTITUTE OF GEOSCIENCE AND MINERAL RESOURCES, Daejon (KR)

( * ) Notice: Subject to any disclaimer, the term of this patent is extended or adjusted under 35 U.S.C. 154(b) by 85 days.

(21) Appl. No.: 13/931,262

(22) Filed: Jun. 28, 2013

(65) Prior Publication Data
US 2014/0101949 A1 Apr. 17, 2014

(30) Foreign Application Priority Data
Jul. 2, 2012 (KR) .................. 10-2012-0071684

(51) Int. Cl.
*G01C 17/16* (2006.01)
*G01C 9/02* (2006.01)

(52) U.S. Cl.
CPC . *G01C 9/02* (2013.01); *G01C 17/16* (2013.01)

(58) Field of Classification Search
CPC .............. G01C 9/24; G01C 9/26; G01C 9/28; G01C 9/12; G01C 9/08; G01C 9/02; G01C 17/16
USPC ............................. 33/343, 354, 521, 355, 1 E
See application file for complete search history.

(56) References Cited

U.S. PATENT DOCUMENTS

| | | | | | |
|---|---|---|---|---|---|
| 2,822,618 | A | * | 2/1958 | Wendel | 33/273 |
| 2,882,603 | A | * | 4/1959 | Ross | 33/277 |
| 2,914,862 | A | * | 12/1959 | Hendriks | 33/301 |
| 6,647,633 | B2 | * | 11/2003 | Iden | 33/352 |
| 6,701,631 | B1 | * | 3/2004 | Monteiro et al. | 33/1 E |
| 8,732,968 | B2 | * | 5/2014 | Kang et al. | 33/1 E |
| 2009/0320308 | A1 | * | 12/2009 | Marcum | 33/521 |
| 2010/0095878 | A1 | * | 4/2010 | Kilgus | 116/201 |

FOREIGN PATENT DOCUMENTS

| | | |
|---|---|---|
| KR | 20-0130506 | 3/1999 |
| RU | 870923 | 11/1979 |
| WO | WO 97/05452 | 2/1997 |

* cited by examiner

*Primary Examiner* — Christopher Fulton
(74) *Attorney, Agent, or Firm* — Norton Rose Fulbright US LLP

(57) ABSTRACT

A clinometer apparatus includes a first measurement member, a second measurement member, and a coupling member. The first measurement member includes a first plate on which first angle indices are formed, and a first coupling unit that has a circumferential surface on which second angle indices are carved. The second measurement member includes a second plate, a second coupling unit that is coupled to the first coupling unit due to the coupling member, and a compass that is coupled to the second plate. The coupling member couples the first coupling unit and the second coupling unit so that the second measurement member rotates relative to the first measurement member about a rotational axis of the first coupling unit.

6 Claims, 2 Drawing Sheets

CLINOMETER APPARATUS

CROSS-REFERENCE TO RELATED APPLICATION

This application claims priority to and the benefit of Korean Patent Application No. 10-2012-0071684, filed on Jul. 2, 2012, the disclosure of which is incorporated herein by reference in its entirety.

BACKGROUND

1. Field of the Invention

The present invention relates to a clinometer apparatus, and more particularly, to a clinometer apparatus that can measure a strike and a dip of a bedding plane and a pitch of a lineation observed on the bedding plane.

2. Discussion of Related Art

In general, a direction of a line of intersection between a bedding plane and a horizontal plane is called a strike, and an angle between the bedding plane and the horizontal plane is called a dip. In an actual field investigation using a conventional clinometer apparatus, the strike is measured by supporting a side surface of a compass on the bedding plane to be made level and reading a direction of a needle, and the dip is measured by locating a tiltmeter in a direction perpendicular to the horizontal plane and reading an angle. When the strike and the dip of the bedding plane are measured using the conventional clinometer apparatus, an operation of measuring the strike and an operation of measuring the dip have to be separately performed. When the operation of measuring the strike and the operation of measuring the dip are separately performed, an error occurs due to the measurement operations when the strike and the dip of the bedding plane are measured.

Also, in order to measure an angle (hereinafter, referred to as a 'pitch of a lineation') between the strike of the bedding plane and the lineation observed as a linear element on the bedding plane, a separate protractor has to be used, and in order to horizontally locate the protractor, a clinometer has to be used. When the pitch of the lineation is measured using the conventional clinometer apparatus, a measurement operation is complex and the risk of an error caused by a gauger is high.

SUMMARY OF THE INVENTION

The present invention is directed to a clinometer apparatus that can accurately measure a strike and a dip of a bedding plane and a pitch of a lineation at the same time.

According to an aspect of the present invention, there is provided a clinometer apparatus including a first measurement member and a second measurement member. The first measurement member may include a first plate that has a first plane on which first angle indices are formed, and a first coupling unit that is coupled to the first plate and has a cylindrical shape having a central axis that is parallel to the first plane and a circumferential surface on which second angle indices are carved. The second measurement member may include a second coupling unit that is coupled to the first coupling unit, a second plate that is coupled to the second coupling unit and is rotatable relative to the first plate about a rotational axis corresponding to the central axis of the first coupling unit, and a compass that is coupled to a second plane of the second plate facing the first plane. The first plate may be formed of a transparent resin material.

In an embodiment of the present invention, the first measurement member may further include a first level that is formed on the first plane, and the second measurement member may further include a second level that is formed on the second plane.

The first measurement member may further include an indicator unit that is coupled to a portion of the first plane where a central point of the first angle indices is located, and is rotatable along the first plane about the central point of the first angle indices. In an embodiment of the present invention, the indicator unit may include a first member having a cylindrical pipe shape that includes an inner passage that extends in one direction and is coupled to a point of the first plane at which the central point of the first angle indices is located, and a second member having a cylindrical shape whose portion is inserted into the inner passage of the first member and that is reciprocatable in both directions along the inner passage. In another embodiment of the present invention, the indicator unit may include an indicating string whose one end portion is coupled to the point of the first plane at which the central point of the first angle indices is located and that is longer than a longest index line from among index lines of the first angle indices.

The second coupling unit may include two fixing units having cylindrical shapes that are coupled to the second plate to be spaced apart from each other with the first coupling unit therebetween, and each have a central axis that is parallel to the central axis of the first coupling unit and a circumferential surface on which reference lines are carved at positions adjacent to the second angle indices.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
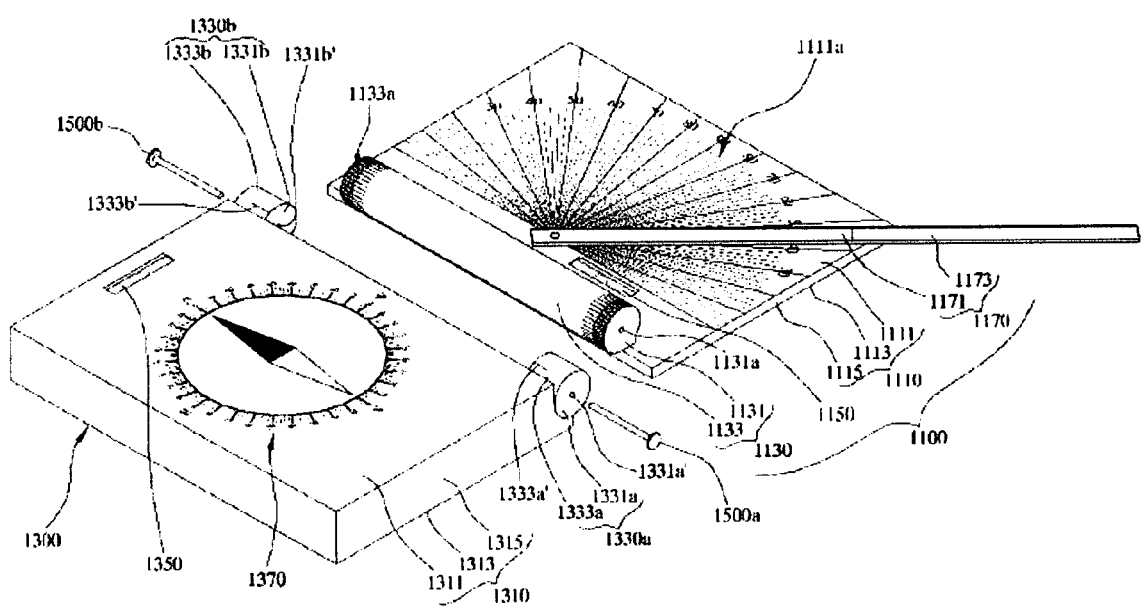
FIG. 1 is a perspective view illustrating a clinometer apparatus according to an embodiment of the present invention.

The present invention will now be described more fully with reference to the accompanying drawings, in which exemplary embodiments of the invention are shown. The present invention will now be described more fully with reference to the accompanying drawings, in which exemplary embodiments of the present invention are shown. It should be understood, however, that there is no intent to limit exemplary embodiments of the present invention to the particular forms disclosed, but conversely, exemplary embodiments of the present invention are to cover all modifications, equivalents, and alternatives falling within the spirit and scope of the present invention. Like reference numerals denote like elements in the drawings. In the attached drawings, sizes of structures may be exaggerated for clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, components, or combinations thereof, but do not preclude the presence or addition of one or more other features, integers, steps, operations, elements, components, or combinations thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined here.

FIG. 1 is a perspective view illustrating a clinometer apparatus 1000 according to an embodiment of the present invention.

Referring to FIG. 1, the clinometer apparatus 1000 may include a first measurement member 1100 and a second measurement member 1300. The first measurement member 1100 and the second measurement member 1300 may be coupled to each other to be folded and unfolded about a predetermined rotational axis, like a hinge.

The first measurement member 1100 may include a first plate 1110, a first coupling unit 1130, and a first level 1150.

The first plate 1110 may be located to be parallel to a bedding plane when a strike and a dip of the bedding plane or information of a lineation existing on the bedding plane are measured. The first plate 1110 is not limited to a shape. For example, the first plate 1110 may have a rectangular plate shape having a predetermined thickness. For example, the first plate 1110 may include a first plane 1111 and a second plane 1113 that face each other, and side surfaces 1115 that connect the first plane 1111 and the second plane 1113. First angle indices 1111a may be formed on the first plane 1111 of the first plate 1110. A pitch of the lineation existing on the bedding plane may be measured using the first angle indices 1111a. The first angle indices 1111a may include indices for measuring angles from '0°' to '180°'. A straight line indicating '0°' and '180°' from among the first angle indices 1111a may be formed to be parallel to the rotational axis of the first measurement member 1100 and the second measurement member 1300. The first plate 1110 may be formed of a transparent resin material so as to observe the lineation existing on the bedding plane from a top surface of the first plate 1110.

The first coupling unit 1130 for being coupled to the second measurement member 1300 may be coupled to the first plate 1110. For example, the first coupling unit 1130 may be coupled to an edge portion of the first plate 1110. For example, the first coupling unit 1130 may have a cylindrical shape that has a central axis corresponding to the rotational axis of the first measurement member 1100 and the second measurement member 1300. When the first coupling unit 1130 has a cylindrical shape, the first coupling unit 1130 may have both end surfaces 1131 and a circumferential surface 1133 that connects the both end surfaces 1131. Second angle indices 1133a may be respectively formed around both end portions of the circumferential surface 1133 of the first coupling unit 1130. The second angle indices 1133a may be formed along the circumferential surface 1133 of the first coupling unit 1130. An angle between the first plate 1110 of the first measurement member 1100 and a second plate 1310 of the second measurement member 1300 may be measured using the second angle indices 1133a. When the first plate 1110 is located to be parallel to the bedding plane and the second plate 1310 is provided to be parallel to a horizontal plane, since the angle between the first plate 1110 and the second plate 1310 corresponds to a 'dip of the bedding plane', the dip of the bedding plane may be measured using the second angle indices 1133a. First coupling holes 1131a for being coupled to a second coupling unit 1330 of the second measurement member 1300 which will be explained below may be respectively formed in the both end surfaces 1131 of the first coupling unit 1130. The first coupling holes 1131a formed in the both end surfaces 1131 may be formed along the central axis of the first coupling unit 1130. The first coupling holes 1131a formed in the both end surfaces 1131 may be connected to each other, or may not be connected to each other by being formed only to predetermined depths from the both end surfaces 1131.

The first level 1150 may include a first bubble tube level that extends in a direction parallel to the central axis of the first coupling unit 1130 and is coupled to the first plate 1110. The first level 1150 may be coupled to a position of the first plane 1111 of the first plate 1110 between the straight line indicating '0°' and '180°' of the first angle indices 1111a and the first coupling unit 1130.

In an embodiment of the present invention, the first measurement member 1100 may further include an indicator unit 1170. The indicator unit 1170 for accurately specifying a direction in which the lineation existing on the bedding plane extends is coupled to the first plane 1111 of the first plate 1110. In detail, the indicator unit 1170 may be coupled to a point of the first plane 1111 at which a central point of the first angle indices 1111a is located, so that the indicator unit 1170 may rotate along the first plane 1111 about the central point of the first angle indices 1111a. For example, the indicator unit 1170 may have a linear shape whose length may be adjusted. For example, the indicator unit 1170 may include a first member 1171 that includes an inner passage that extends in one direction, and a second member 1173 at least a portion of which is inserted into the inner passage of the first member 1171 and that is reciprocatable in both directions along the inner passage. An end portion of the first member 1171 may be coupled to the point of the first plane 1111 at which the central point of the first angle indices 1111a is located, so that the first member 1171 may rotate in both directions along the first plane 1111 about the central point of the first angle indices 1111a. In the indicator unit 1170, since the second member 1173 may move in both directions by being inserted into the inner passage of the first member 1171, a total length of the indicator unit 1170 may be adjusted using the second member 1173. Alternatively, the indicator unit 1170 may include an indicating string (not shown) whose one end portion is fixed to the point of the first plane 1111 at which the central point of the first angle indices 1111a is located. The indicating string may have a length great enough to extend to the outside of the first plate 1110. When the lineation includes a plurality of portions that are too short to specify a direction, the direction of the lineation may be accurately and easily measured by matching the indicator unit 1170 having a relatively long length to the plurality of portions of the lineation.

The second measurement member 1300 may be coupled to the first measurement member 1100 to rotate about the central axis of the first coupling unit 1130. The second measurement member 1300 may include the second plate 1310, the second coupling unit 1330, a second level 1350, and a compass 1370.

The second plate 1310 for obtaining the horizontal plane is located to be parallel to the horizontal plane when the strike and the dip of the bedding plane or the information of the lineation existing on the bedding plane are measured. The second plate 1310 may have a rectangular plate shape having a predetermined thickness. For example, the second plate 1310 may include a third plane 1311 and a fourth plane 1313 that face each other, and side surfaces 1315 that connect the third plane 1311 and the fourth plane 1313.

The second coupling unit 1330 for being coupled to the first coupling unit 1130 is coupled to the second plate 1310. In detail, the second coupling unit 1330 may be coupled to an edge portion of the second plate 1310 which is adjacent to the first plate 1110. The second coupling unit 1330 may include two fixing units 1330a and 1330b having cylindrical shapes that are spaced apart from each other with the first coupling unit 1130 having a cylindrical shape therebetween, and whose central axes correspond to the central axis of the first coupling unit 1130. Second coupling holes 1331a' and 1331b' for being coupled to the first coupling unit 1130 may be respectively formed in the two fixing units 1330a and 1330b. The second coupling holes 1331a' and 1331b' may be formed to respectively pass through the fixing units 1330a and 1330b. Reference lines 1333a' and 1333b' for determining an angle between the first plate 1110 and the second plate 1310 along with the second angle indices 1133a may be respectively formed on circumferential surfaces 1333a and 1333b of the two fixing units 1330a and 1330b.

The compass 1370 may be coupled to the second plate 1310. A 'strike of the bedding plane' which is a direction of a line of intersection between the bedding plane and the horizontal plane may be measured using the compass 1370. The compass 1370 may be a well-known compass. The compass 1370 may be designed such that at least a portion of the compass 1370 is buried in the second plate 1310, and the compass 1370 may be coupled to the third plane 1311 of the second plate 1310.

The second level 1350 may include a second bubble tube level that extends in a direction that crosses a direction in which the first bubble tube level 1150 extends, for example, in a direction perpendicular to the direction in which the first bubble tube level 1150 extends, and is coupled to the second plate 1310. For example, the second level 1350 may be disposed adjacent to the compass 1370.

The first coupling unit 1130 of the first measurement member 1100 and the second coupling unit 1330 of the second measurement member 1300 may be coupled to each other using a separate coupling member 1500 as shown in FIG. 1. In an embodiment of the present invention, when the first coupling holes 1131a formed in the both end surfaces 1131 of the first coupling unit 1130 are not connected to each other, the coupling member 1500 may include a first coupling pin 1500a and a second coupling pin 1500b. The first coupling pin 1500a may pass through the second coupling hole 1331a' formed in one fixing unit 1330a of the second coupling unit 13330, and may be inserted into the first coupling hole 1131a of the first coupling unit 1130. The second coupling pin 1500b may pass through the second coupling hole 1331b' formed in the other fixing unit 1330b of the second coupling unit 1330, and may be inserted into the first coupling hole 1131a of the first coupling unit 1130. Alternatively, when the first coupling holes 1131a formed in the both end surfaces 1131 of the first coupling unit 1130 are connected to each other, although not shown, the coupling member 1500 may include one coupling rod (not shown) that passes through the second coupling hole 1331a' formed in the fixing unit 1330a of the second coupling unit 1330, the first coupling holes 1131a of the first coupling unit 1130, and the second coupling hole 1131b' formed in the fixing unit 1330b of the second coupling unit 1330.

The first measurement member 1100 and the second measurement member 1300 coupled to each other due to the first and second coupling pins 1500a and 1500b may relatively rotate about the rotational axis corresponding to the central axis of the first coupling unit 1130 and the second coupling unit 1330.

A method of measuring a strike and a dip of the bedding plane and an angle (hereinafter, referred to as a 'pitch of the lineation') between the lineation existing on the bedding plane and the strike using the clinometer apparatus 1000 will now be explained.

After the first plate 1110 is closely attached to the bedding plane, the first plate 1110 is located such that a line that is parallel to the first level 1150 from among lines existing on the first plane 1111 of the first plate 1110 is parallel to the horizontal plane using the first level 1150. Next, in a state where the first plate 1110 is fixed, the second plate 1310 is located to be parallel to the horizontal plane using the second level 1350 by rotating the second plate 1310 relative to the first plate 1110. When the first and second plates 1110 and 1310 are located such that the second plate 1310 is parallel to the horizontal plane and the first plate 1110 is parallel to the bedding plane, a direction of a line of intersection between the first plate 1110 and the second plate 1310 corresponds to a 'strike of the bedding plane', and an angle between the first plate 1110 and the second plate 1310 corresponds to a 'dip of the bedding plane'. The strike of the bedding plane may be measured using the compass 1370 of the second measurement member 1300, and the dip of the bedding plane may be measured using the reference lines 1333a' and 1333b' formed on the second coupling unit 1330 of the second measurement member 1300 and the second angle indices 1133a formed on the first coupling unit 1130 of the first measurement member 1100. When the first and second plates 1110 and 1310 are located such that the second plate 1310 is parallel to the horizontal plane and the first plate 1110 is parallel to the bedding plane, the straight line indicating '0°' and '180°' from among the first angle indices 1111a formed on the first plate 1110 is parallel to the strike of the bedding plane.

Figure 2:
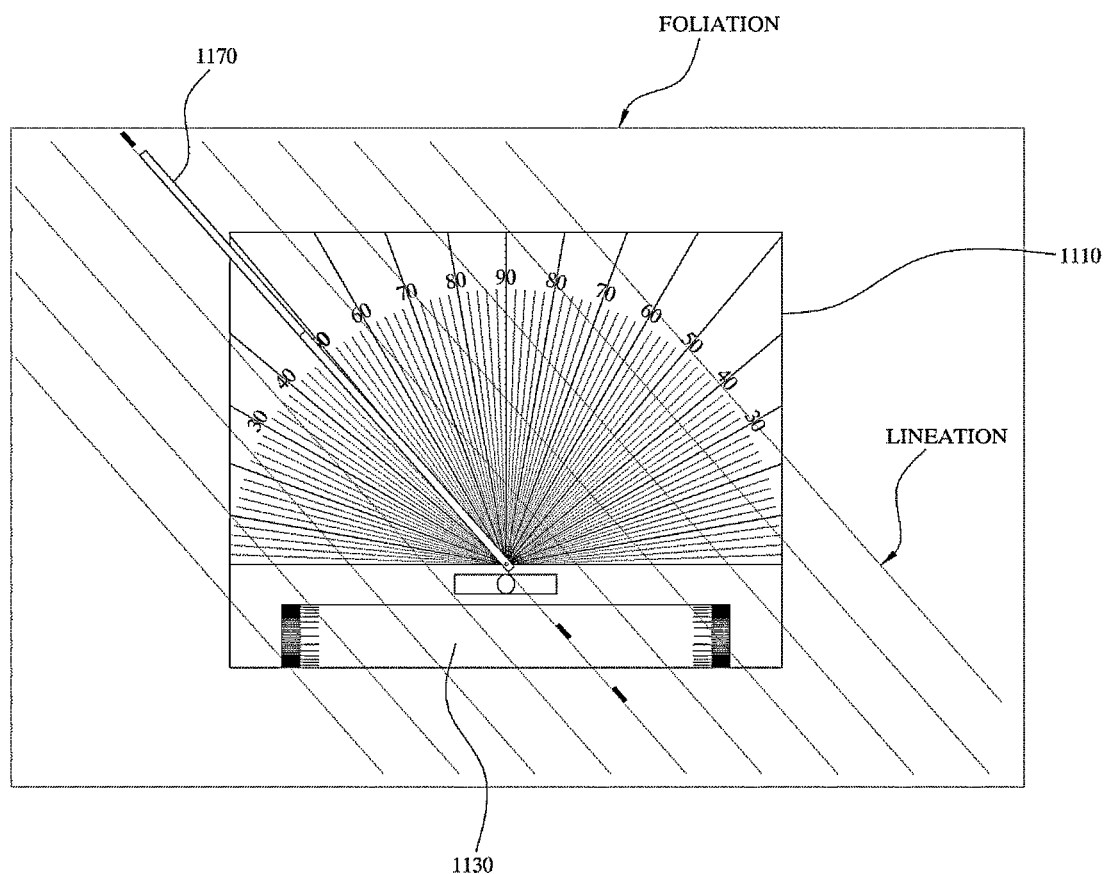
FIG. 2 is a plan view for explaining a method of measuring a pitch of a lineation using the clinometer apparatus of FIG. 1, according to an embodiment of the present invention.

FIG. 2 is a plan view for explaining a method of measuring a pitch of the lineation using the clinometer apparatus 1000 of FIG. 1, according to an embodiment of the present invention.

Referring to FIG. 2, when the lineation straightly extends, a pitch of the lineation may be directly measured using the first angle indices 1111a. However, when the lineation includes a plurality of portions that are too short to specify a direction, it is difficult to accurately measure the pitch of the lineation. In this case, in the present embodiment, the pitch of the lineation may be accurately measured by matching the indicator unit 1170 of the first measurement member 1100 to the plurality of portions of the lineation.

As described above, according to the present invention, since a first measurement member and a second measurement member are coupled to relatively rotate about a predetermined axis, the first measurement member includes a first plate that is transparent and on which first angle indices are formed, and the second measurement member includes a compass, a strike and a dip of a bedding plane and a pitch of a lineation existing on the bedding plane may be accurately measured at the same time. Also, since the first measurement member further includes an indicator unit for specifying a direction in which the lineation extends, even when the lineation includes a plurality of portions that are too short to specify a direction, a pitch of the lineation may be accurately measured.

It will be apparent to those skilled in the an that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A clinometer apparatus comprising:
   a first measurement member comprising a first plate that has a first plane on which first angle indices are formed, a first coupling unit that is coupled to the first plate and has a cylindrical shape comprising a central axis parallel to the first plane and a circumferential surface on which second angle indices are carved, and a linear indicator unit that is coupled to a portion of the first plane where a central point of the first angle indices is located and is rotatable along the first plane about the central point of the first angle indices; and
   a second measurement member comprising a second coupling unit that is coupled to the first coupling unit, a second plate that is coupled to the second coupling unit and is rotatable relative to the first plate about a rotational axis corresponding to the central axis of the first coupling unit, and a compass that is coupled to a second plane of the second plate facing the first plane,
   wherein the indicator unit is extendable to an outside of the first plate.

2. The clinometer apparatus of claim 1, wherein the first plate is formed of a transparent resin material.

3. The clinometer apparatus of claim 1, wherein the first measurement member further comprises a first level that is formed on the first plane, and the second measurement member further comprises a second level that is formed on the second plane.

4. The clinometer apparatus of claim 1, wherein the indicator unit comprises:
   a first member having a cylindrical pipe shape that comprises an inner passage that extends in one direction, and is coupled to a point of the first plane at which the central point of the first angle indices is located; and
   a second member having a cylindrical shape whose portion is inserted into the inner passage of the first member and that is reciprocatable in both directions along the inner passage.

5. The clinometer apparatus of claim 1, wherein the indicator unit comprises an indicating string whose one end portion is coupled to a point of the first plane at which the central point of the first angle indices is located and that is longer than a longest index line from among index lines of the first angle indices.

6. The clinometer apparatus of claim 1, wherein the second coupling unit comprises two fixing units having cylindrical shapes that are coupled to the second plate to be spaced apart from each other with the first coupling unit therebetween, and each comprise a central axis that is parallel to the central axis of the first coupling unit and a circumferential surface on which reference lines are carved at positions adjacent to the second angle indices.

* * * * *